Figure 1:
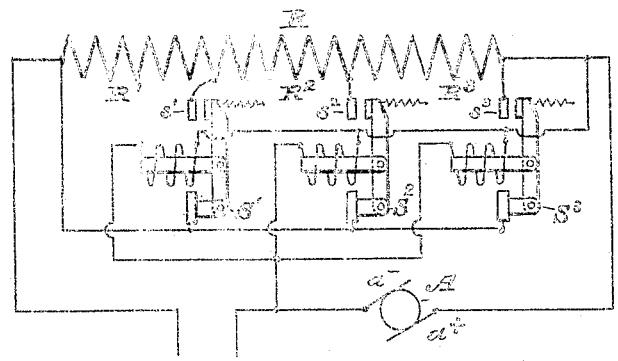

No. 786,635. PATENTED APR. 4, 1905.
A. C. EASTWOOD.
SYSTEM OF CONTROL FOR ELECTRIC MOTORS.
APPLICATION FILED MAR. 21, 1904.

3 SHEETS—SHEET 1.

WITNESSES:
INVENTOR:
Arthur C. Eastwood
by his attorney

No. 786,635. PATENTED APR. 4, 1905.
A. C. EASTWOOD.
SYSTEM OF CONTROL FOR ELECTRIC MOTORS.
APPLICATION FILED MAR. 21, 1904.
3 SHEETS—SHEET 2.
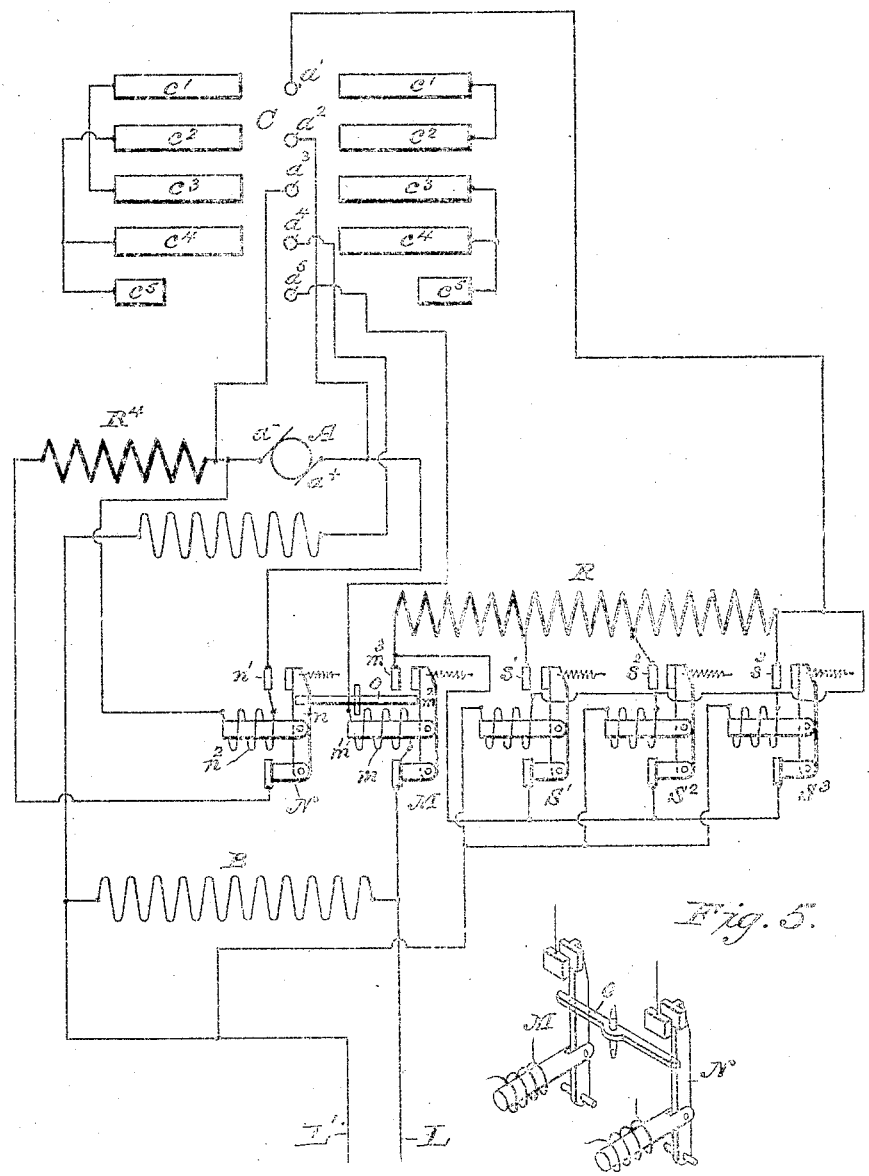
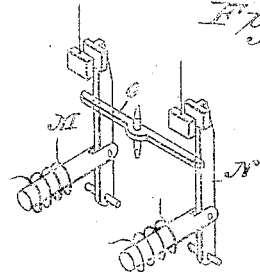

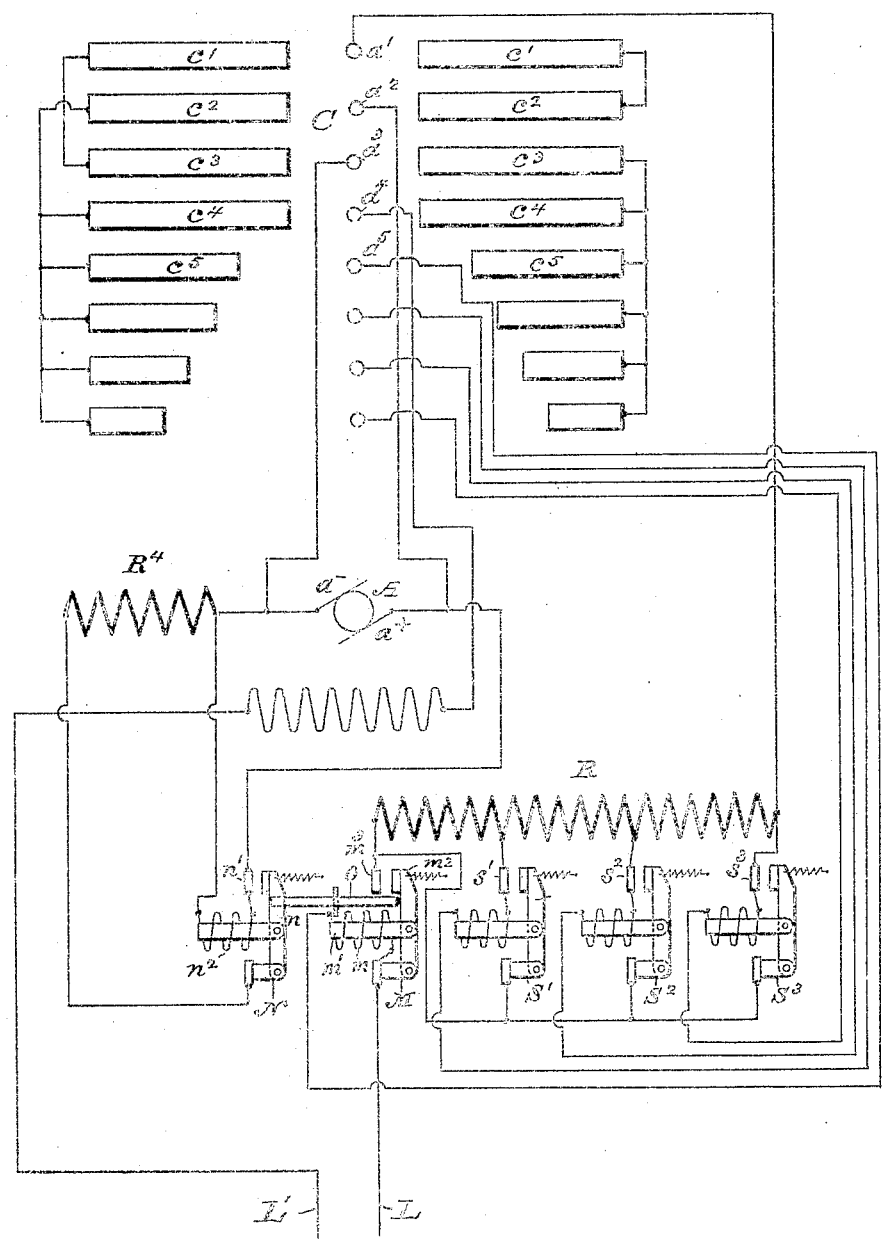

No. 786,635.

Patented April 4, 1905.

UNITED STATES PATENT OFFICE.

ARTHUR C. EASTWOOD, OF CLEVELAND, OHIO.

SYSTEM OF CONTROL FOR ELECTRIC MOTORS.

SPECIFICATION forming part of Letters Patent No. 786,635, dated April 4, 1905.

Application filed March 21, 1904. Serial No. 199,127.

*To all whom it may concern:*

Be it known that I, ARTHUR C. EASTWOOD, a citizen of the United States, and a resident of Cleveland, county of Cuyahoga, and State of Ohio, have invented a new and useful Improvement in Systems of Control for Electric Motors, of which the following is a specification, the principle of the invention being herein explained and the best mode in which I have contemplated applying that principle, so as to distinguish it from other inventions.

My invention relates to improvements in systems for the control of electric motors, it being particularly adapted to motors which must be frequently reversed.

The object of my invention is to produce a system whereby such motor may be reversed as rapidly as is consistent with its capacity and with the strength of the gearing and other parts of the machine to which it is attached and at the same time absorb a minimum power from the source of power-supply. Reversible motors have been applied to certain classes of service in which such reversal was required to be frequent and rapid. Heretofore, however, service of this nature has been found to be very severe on both the driving-motor and the driven machinery, and this has been found to have been due to the heavy current and consequent abnormal strains upon the parts set up at the instant of reversal. In connection with service of this class may be mentioned reversing roller-tables commonly used in iron and steel mills for conveying ingots, billets, or blooms and entering them in the rolls, also certain reciprocating metal-working machines, such as planers, which may be reciprocated by reversing the driving-motor.

The problem of reversing an electrical motor, together with the machinery or parts to which it is attached, may be resolved into two parts—first, that which involves the absorption and dissipation of the energy contained in the armature of the motor and other moving parts connected therewith while in motion; second, the acceleration of the mass consisting of the armature and other moving parts in the reverse direction. In controlling systems heretofore used no provision is made for providing for the first part of the problem, the result being that when the direction of the flow of current through one of the elements of the motor (either armature or field) is suddenly reversed current must be drawn from the line, first, to overcome the forward motion of the armature and the attached load, and, second, to accelerate these parts in the reverse direction. At the instant following the reversal the counter electromotive force generated by the armature of the motor during the continuation of this forward rotation is in the same direction as that of the newly-applied electromotive force, and the instantaneous voltage tending to force current through the windings of the motor may, therefore, be almost double that of the line, and if the resistance connected with the controller be too suddenly cut out the rush of current will be enormous, as the motor at this instant instead of tending to reduce the flow of current by generating an opposing electromotive force actually tends to increase the flow of current by generating an assisting electromotive force.

By means of my invention, however, the armature of the motor and its connected moving parts are automatically and quickly brought to rest with the armature disconnected from the line before current can be applied to the motor for actuating it in the reverse direction. The current which will thus flow through the motor when thus reversed becomes greatly reduced, and the mechanical strain on all the parts of the machine is correspondingly reduced.

In connection with my invention as above outlined I also provide means which prevent the controlling resistance from being too rapidly cut out, thereby still further reducing the current drawn from the line during the acceleration of the velocity of the armature and load in the reverse direction.

The annexed drawings and the following description set forth in detail certain mechanism embodying my invention, the disclosed means, however, constituting but one of the various forms in which the principle of my invention may be used.

Figure 2:
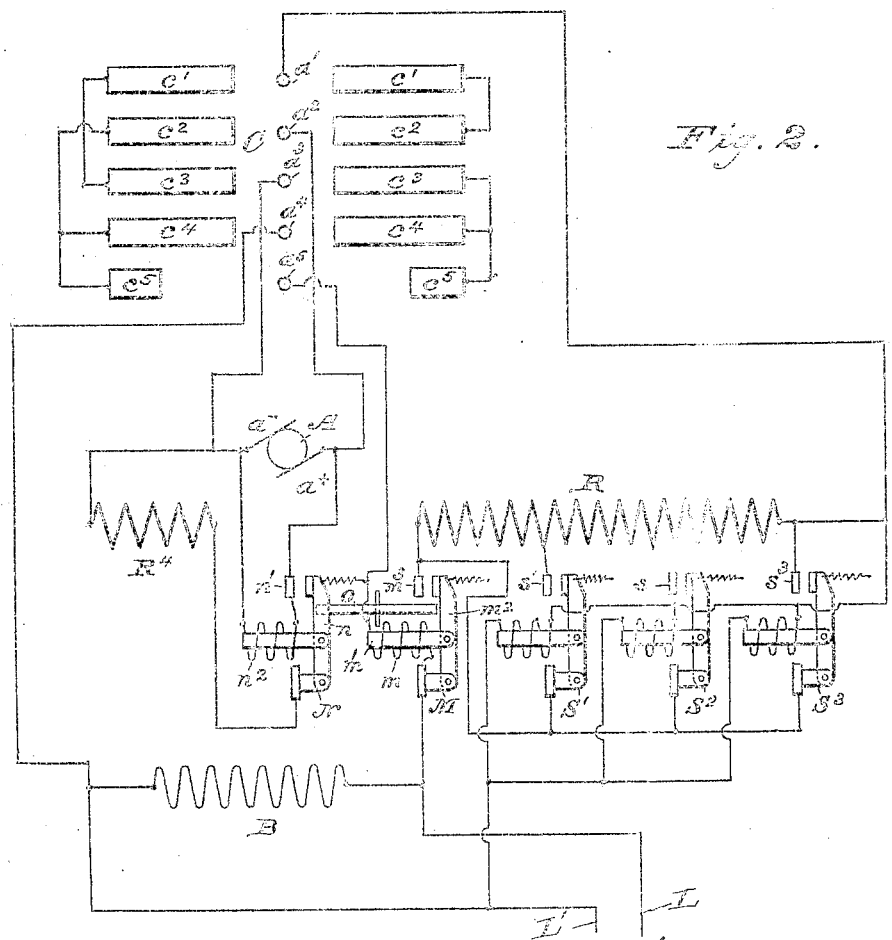

In said annexed drawings, Figure 1 represents a diagrammatic view of an apparatus illustrating the principle of my invention involving the method of acceleration of the motor and connected parts, certain parts and elements which are used in the actual application of my invention being omitted in order to simplify the explanation of the said principle. Fig. 2 represents a diagrammatic view of an apparatus embodying my invention as particularly applied to a shunt-wound motor adapted to operate at its full or a constant speed. Fig. 3 represents a similar diagrammatic view of an apparatus embodying my invention as particularly applied to a compound-wound motor adapted to run at its full or constant speed only. Fig. 4 represents a diagrammatic view of an apparatus embodying my invention as particularly applied to a series-wound motor having various speeds. Fig. 5 represents a detail perspective view of two magnetically-operated switch-arms and a locking-bar in connection therewith.

The elements comprising the apparatus diagrammatically illustrated as embodying my invention consist of a source of current-supply; a motor to be controlled; an operating-controller comprising a reversing-switch for reversing the direction of the current through one element of the motor; a plurality of magnetically-operated switches for controlling the starting resistance; a magnetically-operated short-circuiting switch; an auxiliary circuit including said latter-named switch, together with a resistance, such circuit arranged to short-circuit the armature; a magnetically-operated switch in the main motor-circuit which opens and closes one of the main lines of current-supply to the motor; an interlocking device arranged between the main and short-circuiting switches in a manner such that one must always open before the other can close; a bank of starting resistance in the main motor-circuit, and connections between the operating-controller, the bank of starting resistance, and the exciting-coils of the magnetically-operating resistance-switches arranged in such a manner that the latter must close in a predetermined order, so that the time of their closing will depend upon the amount of current flowing through said resistance.

I shall now proceed to describe in detail the construction and operation of the mechanism illustrated by Fig. 2. In said figure, A represents the armature of the motor, and $a^+$ $a^-$ the brushes thereof. C represents a controller having two sets of segments, a right hand and a left hand, each set embodying five segments $c'$ $c^2$ $c^3$ $c^4$ $c^5$, the lowermost, $c^5$, of each set being shorter than the other four, which are of equal length, as shown. Segments $c'$ $c^3$ of the left-hand set of segments are connected, as shown, and segments $c^2$ $c^4$ $c^5$ are connected with each other, as shown. Of the right-hand set of segments $c'$ $c^2$ are connected, and $c^3$ $c^4$ $c^5$ are connected, as shown. Intermediate of these two sets of segments are five contact-fingers $a'$ $a^2$ $a^3$ $a^4$ $a^5$, arranged so as to be brought respectively into contact with the segments of the controller on the left or right, as will be readily understood. Contact-finger $a^2$ is connected with one of the brushes, $a^+$, and contact-finger $a^3$ is connected with the other of said brushes, $a^-$. Contact-finger $a^4$ is connected with negative main L', and finger $a^5$ is connected, as shown, with the positive main L. This latter connection includes a magnetic coil $m$, which actuates a movable core $m'$, connected with a switch-arm $m^2$ of a switch M. This switch-arm is also provided with a retractile spring, as indicated, to effect a normal or open position thereof, is connected with the positive main of the line, and is adapted to engage a contact $m^3$. This latter contact is connected with a bank of resistance R, the opposite end of which is connected with the contact-finger $a'$, as shown. A series of magnetically-operated switches S', S², and S³ have their coils arranged in parallel, as shown, one end of the coils being connected with the negative main, as shown, and the opposite end being connected with the contact-finger $a'$ at a point intermediate of the latter or the motor and the resistance R. The switch-arms of these switches are respectively adapted to engage contacts $s'$ $s^2$ $s^3$, and these contacts are connected with the ends of the resistance and at intermediate points, as shown. Contact $s^3$ is connected beyond the right-hand end of the resistance. Short-circuiting the brushes $a$ $a$ of the motor is a secondary circuit including a resistance R⁴, a magnetically-operated switch N, including an arm $n$ and contact $n'$. Connecting one of the said brushes $a$ with the contact $n'$ is a conductor including the coil $n^2$, which controls the operation of the switch-arm $n$. It will therefore be seen that when the said arm is caused to engage the contact $n'$ the armature will be short-circuited through the resistance R⁴. The field-winding B of the motor is connected, as shown, in the usual manner.

In the mechanism above described the two magnetically-operated switches M and N are placed in juxtaposition, and an arm O is provided and arranged so as to lock the one switch-arm against closure, while the other is closed, so that but one arm may assume its closing position at any one time and so that the opening operation of either arm will permit a concurrent closing operation of the other.

The switches S' S² S³, previously described, are designed and arranged to operate in accordance with the amount of current flowing through the resistance R. The manner of arranging the parts to effect such result is as follows, the figures introduced in the explanation being merely hypothetical and such as will render such explanation simple in character. Referring now to Fig. 1, let it be assumed that the voltage of the supply-mains be two hundred and ten and let the fractional portions of the resistance R, which are determined by the connections with the contacts $s'$ $s^2$ $s^3$, be designated by $R'R^2R^3$. Let it be further assumed that the resistances of $R'$ $R^2$ $R^3$ are respectively one ohm each, R having, therefore, a resistance of three ohms. Switches $S'$ $S^2$ $S^3$ are so adjusted that $S'$ will close when 70.1 volts are applied to its coil, $S^2$ will close when 116.8 volts are applied to its coil, and $S^3$ will close when 163.4 volts are applied to its coil. Now if the circuit be completed through the resistance R and the armature of the motor A with the latter at rest an initial current of $\frac{210}{3} = 70$ amperes will flow through the circuit. It is evident that the voltage applied to the coils of the switches will always be equal to the difference between the voltage of the circuit and the drop which occurs through the passage of the current through the resistance. At the instant the circuit is closed practically the full applied voltage is absorbed by the resistance, so that at that instant there will be practically no voltage applied to the switch-coils. However, as the armature begins to revolve the current flowing through the circuit will be reduced owing to the counter electromotive force set up in the armature, and as the current is so reduced the drop through the resistance will also be reduced, and hence the voltage applied to the switch-coils will be increased. When the current has dropped to such a value that the drop through the resistance will be 139.9 volts, the voltage applied to the switch-coils will be $210 - 139.9$, or 70.1, and switch $S'$ will therefore close. This will occur when the current has dropped to such a value that it will cause a drop of 139.9 through a resistance of three ohms. Hence the value of the current will be $\frac{139.9}{3}$, or 46.6 amperes. When switch $S'$ has closed, resistance $R'$ will be short-circuited and a resistance equal to that of $R^2$ plus $R^3$, or two ohms, will be left in the circuit. The current through the circuit will therefore be momentarily increased, but will be again reduced by the acceleration of the armature of the motor. When the voltage applied to the terminals of the switch-coils has increased to 116.8, the switch $S^2$ will close, the said switch being, as previously stated, arranged to close at this voltage. In other words, when the drop through the remaining resistance will have reached 93.2 volts the difference between the voltage of the line and the said drop will be 116.8, or that required by switch $S^2$. The value of such a current will hence be equal to $\frac{93.2}{2}$, or 46.6 amperes. Similarly switch $S^3$ will close when the voltage applied to its coil is 163.4, and a similar calculation will show that this will occur when the current has again dropped to 46.6 amperes with one ohm in the circuit. It will therefore be seen that switches $S'$ $S^2$ $S^3$ are automatically caused to operate in a predetermined manner and in succession, such operation involving the successive short-circuiting of sections of resistance in the motor-circuit. In the above example the current of 46.6 amperes is taken to represent the full-load current of the given motor, while the initial current of seventy amperes will represent a fifty-per-cent. overload on the same motor. It is evident from the above that by the use of my invention the current is confined to a safe value and the sections of resistance cannot be cut out until in each case the current is reduced to a normal value, in this manner perfectly protecting the motor. An inspection of Figs. 2, 3, and 4 will show that the above-described method of cutting out or short-circuiting the starting resistance is used in each case illustrated, and a further detailed description of this operation will hereinafter in consequence not be again resorted to. Referring again to Fig. 2, let it be assumed that the motor is at rest and that the segments of the controller are disengaged from the contact-fingers. Now let it be assumed that the controller is moved so as to bring the right-hand segment into engagement with the contact-fingers. Such operation having been effected, it will be seen that current will pass from the positive main into the coil $m$ of the switch M, immediately closing the latter. Current will hence pass through this arm through the resistance R, the switches $S'$ $S^2$ $S^3$ closing in succession, and so in three steps bringing the motor up to its full speed. The counter electromotive force generated by the motor exerts an effect upon the switch N such as to tend to close same and short-circuit the armature through the resistance $R^4$. Such action is, however, prevented by reason of its interdependence with the switch M through the medium of the locking-bar O. Now let the controller be thrown over so as to bring the left-hand segments into engagement with the contact-fingers. Before such contact, however, takes place there will be a short period of time in which the said fingers will be entirely disconnected from the segments, and the current will hence be absolutely cut off from the motor and motor-circuit. Immediately this breaking of the circuit takes place the switch N, which is, as previously described, constantly under tension by reason of the action of counter electromotive force of the motor, closes, thus short-circuiting the motor through the resistance $R^4$ and dissipating the energy so generated as heat in said resistance. The resistance $R^4$ is so proportioned that the full counter electromotive force of the armature A will produce a current through it which will not exceed a fifty-per-cent. overload on said motor, thus limiting the banking function to a point which the motor will safely stand. The coil of the switch N, being excited by the counter electromotive force of the armature, will continue to be excited as long as the armature is in motion and will therefore tend to hold switch N closed until the armature has been practically brought to rest. In the meantime the set of contacts in the left of the controller may have been brought into contact with the fingers, thus reversing the connections to the armature A and closing the circuit of the coil of the switch M. No current, however, can flow from the line to the motor until the switch M is closed. The switch M will tend to close, but will be unable to do so until switch N opens, owing to the action of the locking-bar O. It will be understood that the plunger of the switch N will be included in a practically closed magnetic circuit when the switch is closed, while the plunger of the switch M will be included in a magnetic circuit containing a relatively large air-gap, since this switch is open, and therefore the pull of the switch M in tending to close cannot overcome the relatively heavy pull of the switch N until the counter electromotive force which excites the coil of the switch N has practically dropped to zero. Engagement of the contact-fingers with the segments now having been effected, it will be seen that the current from the main will be reversed through the armature and that the switch-arm of the switch N will be disconnected from the contact $n$. Such action, it will hence be seen, will permit the switch-arm of switch N to be actuated to close the motor-circuit, as before, as soon as the armature has been brought to rest. Upon such closing of said circuit the current flows through the resistance R, and the switch-arms of the magnetically-operated switches $S'$ $S^2$ $S^3$ are successively actuated, as previously described, to first short-circuit successive fractions of said resistance, and finally to short-circuit the whole resistance, thereby accelerating, as before, the speed of the motor in three steps until it attains its full or constant speed.

An inspection of Fig. 3 will disclose the fact that the arrangement of my invention for application to a compound-wound motor is substantially identical with that for the shunt-wound motor where each is adapted for full or constant speed only.

In order to provide for various speeds, any one of which may be maintained indefinitely, it is only necessary to eliminate the automatic successive actuation of the magnetically-operated switches $S'$ $S^2$ $S^3$ and provide means whereby the actuation of said switches will be dependent upon the contact of corresponding segments of the controller with corresponding contact-fingers. Such an arrangement is illustrated in Fig. 4, in which, as will be noted from inspection of said figure, additional segments are provided on each side of the controller as well as additional contact-fingers. Each one of said additional fingers is connected with one end of one of the switch-operating coils, respectively, as shown, the other ends of said coils being connected as before. From the above arrangement it will hence be seen that the speed of the motor may be varied by bringing the various additional segments into contact with their respective contact-fingers and permitting them to remain in such contact as may be desired.

Other modes of applying the principle of my invention may be employed instead of the one explained, change being made as regards the mechanism herein disclosed, provided the means stated by any one of the following claims or the equivalent of such stated means be employed.

I therefore particularly point out and distinctly claim as my invention—

1. In a controlling system for motors, the combination of means for reversing the motor, electrical means independent of said reversing means for automatically absorbing the energy of the moving parts prior to such reversing, and means for automatically accelerating the motor subsequently to such absorption.

2. In reversing mechanism for motors, the combination of a motor-circuit, means for reversing the current through one of the motor elements, a conductor including a resistance short-circuiting the armature, automatically-operating means for closing such short-circuiting conductor and means for opening said motor-circuit concurrently with the closing operation of said short-circuiting means.

3. In reversing mechanism for motors, the combination of a motor-circuit, means for reversing the current through one of the motor elements, a conductor including a resistance short-circuiting the armature, automatically-operating means for closing such short-circuiting conductor, and means for opening said motor-circuit concurrently with the closing operation of said short-circuiting means, such two closing means being arranged so as to cause the operation of one to be dependent upon the operation of the other.

4. In reversing mechanism for motors, the combination of a motor-circuit, means for reversing the current through one of the motor elements, controlling means including a magnetically-operated switch for closing the armature-circuit through a resistance, and means for rendering such switch inoperative during the normal operation of the motor, and arranged to become operative when the motor-circuit is broken.

5. In reversing mechanism for motors, the combination of a motor-circuit, means for reversing the current through one of the motor elements, controlling means including a magnetically-operated switch for closing the armature-circuit through a resistance, and a second magnetically-operated switch arranged to open and close the motor-circuit, said two switches being arranged to be interdependent so that the closure of either switch is prohibited while the other is closed.

6. In reversing mechanism for motors, the combination of a motor-circuit, a magnetically-operated switch in said circuit for opening and closing same, a conductor containing a resistance and arranged to short-circuit the motor-armature, and a magnetically-operated switch controlled by the motor and arranged to cut said conductor into or out of its circuit, said two switches being interdependent whereby the closure of either is prohibited while the other is closed.

7. In reversing mechanism for motors, the combination of a motor-circuit, a magnetically-operated switch in said circuit for opening and closing the latter, a second magnetically-operated switch controlled by the motor, a conductor containing a resistance arranged to short-circuit the armature and controlled by said second switch; and means for preventing the closure of either of said switches while the other is closed.

8. In reversing mechanism for motors, the combination of a main motor-circuit, a magnetically-operated switch in said circuit for opening and closing same automatically; a secondary circuit including the armature, a resistance, and a magnetically-operated switch arranged to open and close said secondary circuit, and controlled by said motor; said two switches being arranged so that the closure of either will prohibit the closure of the other.

9. In reversing mechanism for motors, the combination of a motor-circuit, means for reversing the current through one of the motor elements, a resistance and means independent of said reversing means for short-circuiting the armature through such resistance when the current is shut off from the said motor element, a bank of resistance in the motor-circuit, and means for short-circuiting said bank of resistance and fractions thereof, such latter means arranged to act concurrently with the reversing of the current.

10. In reversing mechanism for motors, the combination of a motor-circuit, means for reversing the current through one of the motor elements, a magnetically-operated switch controlled by the motor for short-circuiting the armature through a resistance, a second magnetically-operated switch controlled by the main current-supply and arranged to open and close the motor-circuit, said two switches being interdependent and arranged so that the closure of either is prohibited while the other is open; a bank of resistance in the motor-circuit, a series of magnetically-operated switches controlled by the current of the motor-circuit, such switches being arranged to operate automatically and successively to cut out fractions of said bank of resistance.

11. In reversing mechanism for motors, the combination of a motor-circuit, means for reversing the current through one of the motor elements, means independent of such reversing means for preventing such reversal prior to the time the moving element of such motor is brought to rest, and means for automatically effecting such reversal after such state of rest is effected.

12. In reversing mechanism for motors, the combination of a motor-circuit, means for reversing the current through one of the motor elements, means for absorbing the energy generated by the moving motor element prior to such reversal, means independent of such reversing means for preventing such reversal prior to the time said moving element is brought to rest, and means for automatically effecting such reversal after such state of rest is effected.

Signed by me this 7th day of March, 1904.

ARTHUR C. EASTWOOD.

Attest:
  A. E. MERKEL,
  G. W. SAYWELL.